United States Patent
Takahashi

(10) Patent No.: US 10,107,941 B2
(45) Date of Patent: Oct. 23, 2018

(54) OPTICAL PRODUCT, AND SPECTACLE LENS AND SPECTACLES

(71) Applicant: TOKAI OPTICAL CO., LTD., Okazaki-Shi (JP)

(72) Inventor: Hirotoshi Takahashi, Okazaki (JP)

(73) Assignee: Tokai Optical Co., Ltd., Ozazaki-Shi (JP)

( * ) Notice: Subject to any disclaimer, the term of this patent is extended or adjusted under 35 U.S.C. 154(b) by 101 days.

(21) Appl. No.: 15/194,970

(22) Filed: Jun. 28, 2016

(65) Prior Publication Data

US 2016/0306190 A1    Oct. 20, 2016

Related U.S. Application Data

(63) Continuation of application No. PCT/JP2015/052347, filed on Jan. 28, 2015.

(30) Foreign Application Priority Data

Feb. 13, 2014 (JP) .................. 2014-025752

(51) Int. Cl.
*G02C 7/10* (2006.01)
*G02B 1/11* (2015.01)
(Continued)

(52) U.S. Cl.
CPC .............. *G02B 1/11* (2013.01); *G02B 1/115* (2013.01); *G02B 1/14* (2015.01); *G02C 7/02* (2013.01);
(Continued)

(58) Field of Classification Search
CPC . G02B 1/10; G02B 1/105; G02B 1/11; G02B 1/111; G02B 1/13; G02B 1/18;
(Continued)

(56) References Cited

U.S. PATENT DOCUMENTS

2006/0177638 A1   8/2006   Shibuya et al.
2010/0238557 A1   9/2010   Tomoda
(Continued)

FOREIGN PATENT DOCUMENTS

EP   2 199 835 A1   6/2010
EP   2 624 044 A1   8/2013
(Continued)

OTHER PUBLICATIONS

European Search Report, European Application No. 15749191.1, dated Aug. 2, 2017 (7 pages).
(Continued)

*Primary Examiner* — Darryl J Collins
(74) *Attorney, Agent, or Firm* — Burr & Brown, PLLC

(57) ABSTRACT

It is an object to provide an optical product and the like which have antireflective performance, require less number of types of materials for film formation, have a simple film structure which makes film formation easy and reduces costs, and have sufficient heat resistance. In the optical product, an optical multilayer film having a five-layer structure in which $SiO_2$ and $ZrO_2$ are alternately layered is provided on one or both of surfaces of a base. With a layer closest to the base being a first layer, a quotient obtained by dividing a physical thickness of a fourth layer that is $ZrO_2$ by a physical thickness of a second layer that is $ZrO_2$ is greater than or equal to 1 and not greater than 4.

3 Claims, 2 Drawing Sheets

(51) Int. Cl.
    *G02B 1/14*     (2015.01)
    *G02C 7/02*     (2006.01)
    *G02B 1/115*     (2015.01)

(52) U.S. Cl.
    CPC .............. *G02C 7/022* (2013.01); *G02C 7/10* (2013.01); *G02C 7/104* (2013.01); *G02C 2202/16* (2013.01)

(58) Field of Classification Search
    CPC ... G02C 7/02; G02C 7/04; G02C 7/10; G02C 7/022; G02C 2202/16
    USPC ........... 351/159.01, 159.02; 359/642; 428/46
    See application file for complete search history.

(56) References Cited

U.S. PATENT DOCUMENTS

| | | | |
|---|---|---|---|
| 2013/0176615 A1* | 7/2013 | Uefuji | G02B 1/113 359/359 |
| 2013/0222913 A1 | 8/2013 | Tomoda et al. | |

FOREIGN PATENT DOCUMENTS

| | | |
|---|---|---|
| JP | 2005-234188 A1 | 9/2005 |
| JP | 2005-274938 A1 | 10/2005 |
| JP | 2006-251760 A | 9/2006 |
| JP | 2006-276123 A1 | 10/2006 |
| JP | 2007-078780 A1 | 3/2007 |
| JP | 2011-017949 A1 | 1/2011 |
| JP | 2012-093689 A1 | 5/2012 |
| WO | 2009/041580 A1 | 4/2009 |

OTHER PUBLICATIONS

International Search Report and Written Opinion (Application No. PCT/JP2015/052347) dated Mar. 10, 2015.

Japanese Office Action (with English translation), Japanese Application No. 2014-025752, dated Apr. 26, 2018 (7 pages).

* cited by examiner

OPTICAL PRODUCT, AND SPECTACLE LENS AND SPECTACLES

This application is a Continuation of International Application No. PCT/JP2015/052347, filed on Jan. 28, 2015, which claims the benefit of Japanese Patent Application Number 2014-025752 filed on Feb. 13, 2014, the disclosures of which are incorporated by reference herein in their entireties.

BACKGROUND OF INVENTION

Technical Field

The present invention relates to optical products such as spectacle lenses (including sunglass lenses), and spectacles (including sunglasses) that use the spectacle lenses.

Background Art

As spectacle lenses with improved heat resistance, the products disclosed in Japanese Laid-Open Patent Publication No. 2006-276123 (JP 2006-276123 A) and Japanese Laid-Open Patent Publication No. 2005-234188 (JP 2005-234188 A) are known.

The spectacle lens disclosed in JP 2006-276123 A includes antireflection films on an object-side surface and an eyeball-side surface of a lens base. The antireflection film contains at least one of silicon oxide, titanium oxide, lanthanum titanate, tantalum oxide, and niobium oxide, whereby the object-side antireflection film is caused to have a compressive stress, and the eyeball-side antireflection film is caused to have a compressive stress less than that of the object-side antireflection film or to have a tensile stress.

In the product disclosed in JP 2005-234188 A, an antireflection film is formed of a combination of ternary materials, i.e., silicon oxide, a sintered mixture of titanium oxide, lanthanum oxide, and titanium, and a material having a refractive index higher than that of silicon oxide, thereby providing heat resistance performance.

SUMMARY OF THE INVENTION

In the product disclosed in JP 2006-276123 A, the antireflection film should be formed so that silicon oxide or the like has a predetermined compressive stress or tensile stress. Therefore, the film structure for providing sufficient heat resistance while having antireflective performance is complicated, resulting in high costs.

Meanwhile, in the product disclosed in JP 2005-234188 A, since the antireflection film is formed of the combination of the ternary materials as described above, difficulty in controlling film design and film formation is increased, resulting in high costs for film formation.

Therefore, the present invention has an object to provide an optical product, a spectacle lens, and spectacles, which have antireflective performance, require less number of types of materials for film formation, have a simple film structure which makes film formation easy and reduces costs, and have sufficient heat resistance.

In order to attain the aforementioned object, a first aspect of the invention provides an optical product in which (A) an optical multilayer film having a five-layer structure in which $SiO_2$ and $ZrO_2$ are alternately layered is provided on one or both of surfaces of a base, and (B-1) with a layer closest to the base being a first layer, a quotient obtained by dividing a physical thickness of a fourth layer that is $ZrO_2$ by a physical thickness of a second layer that is $ZrO_2$ is greater than or equal to 1 and not greater than 4.

In order to attain the aforementioned object, a second aspect of the invention provides an optical product in which (A) an optical multilayer film having a five-layer structure in which $SiO_2$ and $ZrO_2$ are alternately layered is provided on one or both of surfaces of a base, and (B-2) with a layer closest to the base being a first layer, a quotient obtained by dividing a physical thickness of a fourth layer that is $ZrO_2$ by a physical thickness of a second layer that is $ZrO_2$ is greater than or equal to 1 and not greater than 3.

In order to attain the aforementioned object, a third aspect of the invention provides an optical product in which (A) an optical multilayer film having a five-layer structure in which $SiO_2$ and $ZrO_2$ are alternately layered is provided on one or both of surfaces of a base, and (B-3) with a layer closest to the base being a first layer, a quotient obtained by dividing a physical thickness of a fourth layer that is $ZrO_2$ by a physical thickness of a second layer that is $ZrO_2$ is greater than or equal to 1 and not greater than 2.

In order to attain the aforementioned object, a fourth aspect of the invention provides an optical product in which (A) an optical multilayer film having a five-layer structure in which $SiO_2$ and $ZrO_2$ are alternately layered is provided on one or both of surfaces of a base, and (B-4) with a layer closest to the base being a first layer, a quotient obtained by dividing a physical thickness of a fourth layer that is $ZrO_2$ by a physical thickness of a second layer that is $ZrO_2$ is greater than or equal to 1 and not greater than 1.5.

A fifth aspect of the invention provides a spectacle lens using the optical product according to the above-described invention.

A sixth aspect of the invention provides spectacles using the spectacle lens according to the above-described invention.

The present invention exerts an effect of providing an optical product, a spectacle lens, and spectacles which require less number of types of materials for film formation, have a simple film structure which makes film formation easy and reduces costs, and have both antireflective properties and heat resistance.

DESCRIPTION OF EMBODIMENTS

Figure 1:
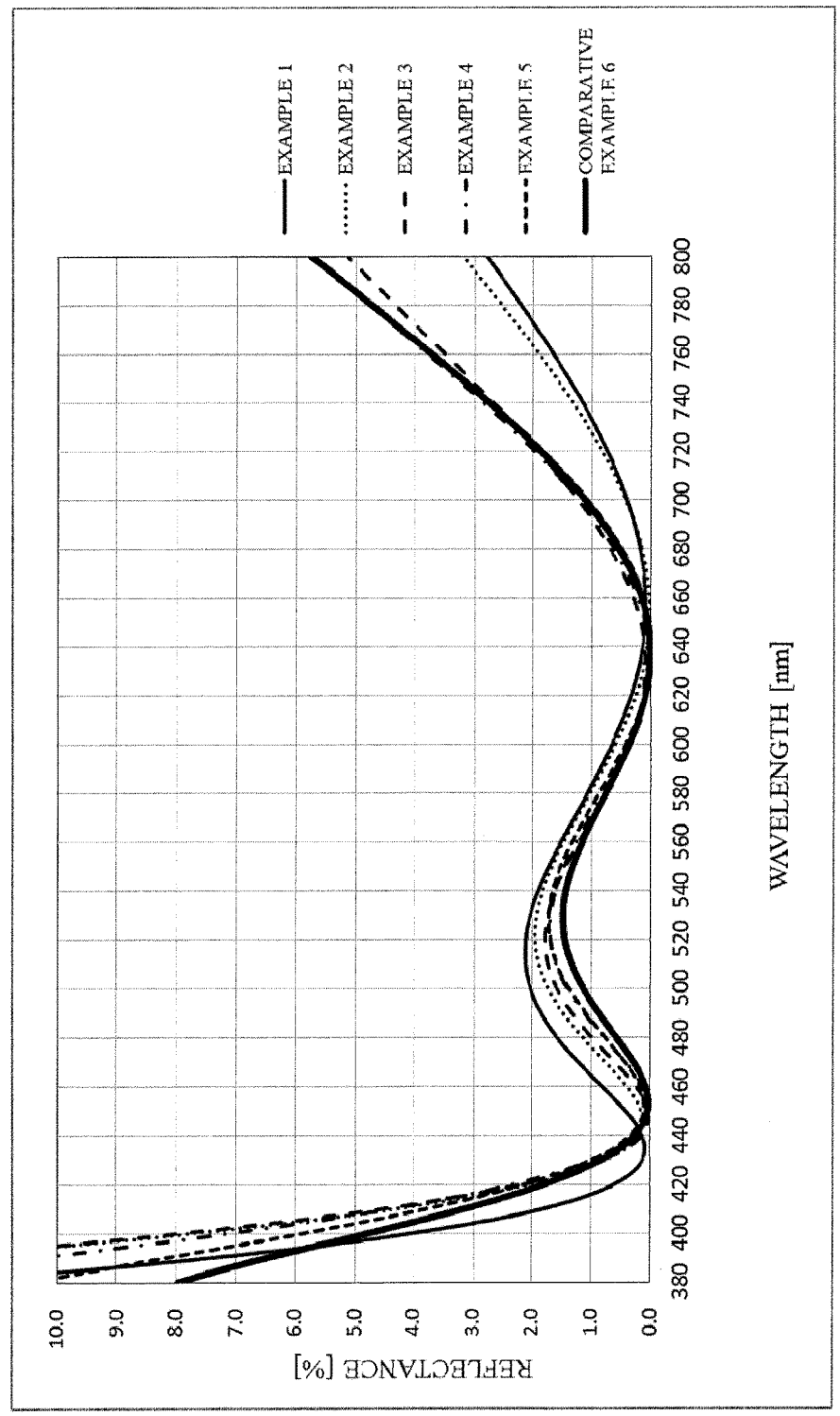
FIG. 1 shows a graph representing a spectral reflectance distribution in a visible region according to Examples 1 to 5 and Comparative Example 6.

An exemplary embodiment of the present invention will be described below with reference to the drawings as appropriate. The present invention is not limited to the exemplary embodiment described below.

A spectacle lens according to the present invention has an optical multilayer film on one surface or both surfaces of a base.

In the present invention, the base may be made of any material, and is preferably translucent. Examples of the material (base material) of the base include a polyurethane resin, a thiourethane resin, an episulfide resin, a polycarbonate resin, a polyester resin, an acrylic resin, a polyether sulfone resin, a poly(4-methylpentene-1) resin, and a diethylene glycol bis(allyl carbonate) resin. Further, examples of the material include, as a preferable material (for, in particular, a spectacle lens) having a high refractive index, an episulfide resin obtained by addition-polymerization of an episulfide group with polythiol and/or a sulfur-containing polyol.

Further, in the present invention, the optical multilayer film satisfies the following conditions. When the optical multilayer films are formed on both the surfaces, both of the films preferably satisfy the following conditions, and more preferably have the same layered structure.

Firstly, the optical multilayer film has a five-layer structure in which low refractive index layers and high refractive index layers are alternately layered. When a nearest layer to the base (the layer closest to the base) is a first layer, odd-numbered layers are the low refractive index layers and even-numbered layers are high refractive index layers.

Next, the low refractive index layers are formed by using silica (silicon dioxide, $SiO_2$), and the high refractive index layers are formed by using zirconia (zirconium dioxide, $ZrO_2$).

A quotient obtained by dividing the physical thickness of the fourth layer (high refractive index layer) by the physical thickness of the second layer (high refractive index layer) is greater than or equal to 1 and not greater than 4. This quotient (solution of division) is preferably greater than or equal to 1 and not greater than 3, more preferably greater than or equal to 1 and not greater than 2, and still more preferably greater than or equal to 1 and not greater than 1.5 (3/2).

When the quotient is less than 1 and the physical thickness of the second layer is greater than the physical thickness of the fourth layer, the reflectance in a visible region (in which the wavelength is greater than or equal to 400 nanometers (nm) and not greater than 800 nm, or is greater than or equal to 400 nm and not greater than 780 nm) is likely to increase, which makes it difficult to design an optical multilayer film for preventing reflection of light in the visible region. In contrast, in the present invention, since the quotient is greater than or equal to 1 and the physical thickness of the second layer is less than the physical thickness of the fourth layer, it is easy to increase the transmittance in the visible region, whereby sufficient antireflective performance can be provided.

On the other hand, when the quotient is greater than 4, the physical thickness of the fourth layer exceeds four times the physical thickness of the second layer. In this case, a stress in the second layer and a stress in the fourth layer, which occur during heating, are not well balanced, and one of the stresses becomes excessively greater than the other stress, whereby an excess force is applied to the optical multilayer film and the base during heating. Such excess force causes distortion or crack, and heat resistance becomes relatively insufficient. In contrast, in the present invention, since the quotient is not greater than 4, the stress in the second layer and the stress in the fourth layer, which occur during heating, are well balanced, whereby an excess force is prevented from being applied to the optical multilayer film and the base during heating. Thus, distortion and crack are prevented, and sufficient heat resistance performance can be provided. Further, as the quotient approaches closer to 1, the stresses are better balanced, and the heat resistance is more improved. The quotient is preferably not greater than 3, more preferably not greater than 2, and still more preferably not greater than 1.5.

The optical multilayer film is preferably formed by a vacuum deposition method or a sputtering method.

In the present invention, another kind of film such as a hard coating film or an antifouling film (water repellent film) may be additionally provided between the optical multilayer film and the base and/or on the surface of the optical multilayer film. When the optical multilayer films are formed on both the surfaces, the kind of the film to be additionally provided may be different between both the surfaces, or whether or not the film is provided may be determined for each surface.

When a hard coating film is used as the film to be provided between the optical multilayer film and the base, the hard coating film is advantageously formed by hard coating solution being uniformly applied to the surface of the base.

Further, for the hard coating film, an organosiloxane resin containing inorganic oxide particles can be preferably used. An organosiloxane resin obtained by hydrolyzing and condensing an alkoxysilane is preferred as the organosiloxane resin. Further, specific examples of the organosiloxane resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are manufactured by hydrolyzing the alkoxysilane compounds or a combination thereof by an acidic aqueous solution such as hydrochloric acid.

Meanwhile, as an exemplary material of the inorganic oxide particles, specifically, a sol of zinc oxide, silicon dioxide (silica particulates), aluminum oxide, titanium oxide (titania particulates), zirconium oxide (zirconia particulates), tin oxide, beryllium oxide, antimony oxide, tungsten oxide, or cerium oxide, or mixed crystals of two or more of the sols, can be used. The diameter of the inorganic oxide particle is preferably greater than or equal to 1 nm and not greater than 100 nm, and more preferably greater than or equal to 1 nm and not greater than 50 nm in order to ensure transparency of the hard coating film. Further, an amount (concentration) of the inorganic oxide particles to be blended is preferably greater than or equal to 40% by weight of all the components of the hard coating film and not greater than 60% by weight thereof in order to ensure appropriate levels of hardness and toughness of the hard coating film. In addition, the hard coating solution may contain an acetylacetone metal salt, an ethylenediaminetetraacetic acid metal salt, and/or the like, as a curing catalyst. Further, the hard coating solution may contain a surfactant, a colorant, a solvent, or the like, as necessary for, for example, ensuring adhesion to the base, facilitating formation, and coloring with a desired (semi)transparent color.

The physical film thickness of the hard coating film is preferably greater than or equal to 0.5 μm (micrometer) and not greater than 4.0 μm. When the film thickness is in the range, a sufficient hardness is obtained and a possibility of occurrence of physical problems is not high. In other words, when the film thickness is less than the lower limit, a sufficient hardness is not obtained, and when the thickness is more than the upper limit, the possibility of occurrence of the physical problems such as generation of cracks or fragility is significantly increased.

Further, a primer layer may be additionally provided between the hard coating film and the base surface. Examples of a material of the primer layer include a polyurethane-based resin, an acrylic resin, a methacrylic resin, an organosilicon resin, and a combination thereof.

The optical multilayer film of the optical product has the five-layer structure in which the low refractive index layers and the high refractive index layers are alternately layered. The low refractive index layers are formed by using $SiO_2$, and the high refractive index layers are formed by using $ZrO_2$. Therefore, the optical multilayer film has a simple film structure, and is easily formed at low costs.

In the above-described optical product, the quotient obtained by dividing the physical thickness of the fourth layer by the physical thickness of the second layer is greater than or equal to 1 and not greater than 4, preferably greater than or equal to 1 and not greater than 3, more preferably greater than or equal to 1 and not greater than 2, and still more preferably greater than or equal to 1 and not greater than 1.5 (3/2). Therefore, it is possible to provide sufficient heat resistance while ensuring antireflective properties in a visible region (in which light has, for example, a wavelength greater than or equal to 400 nm and not greater than 800 nm, a wavelength greater than or equal to 450 nm and not greater than 800 nm, a wavelength greater than or equal to 450 nm and not greater than 750 nm, or the like).

In the above-described optical product, preferably, the base is a spectacle lens base, and the optical product is a spectacle lens. Further, spectacles that are excellent in heat resistance while preventing reflection of light in the visible region can be produced at relatively low costs by using the spectacle lens.

Next, Examples of the present invention according to the above-described embodiment and Comparative Examples 1 to 6 that do not belong to the present invention, will be described. The embodiment of the present invention is not limited to the examples described below.

A plurality of spectacle lens bases of the same type were prepared, and intermediate films and optical multilayer films were formed on both surfaces of each spectacle lens base such that the kinds of these films are different among the spectacle lens bases, to produce the spectacle lenses according to Examples 1 to 5 and Comparative Examples 1 to 6.

The spectacle lens base was a spherical lens base made of a thiourethane-based resin and having the power of S-2.00, and the refractive index was 1.60, and the Abbe number was 41, and a circular lens having a standard size as a spectacle lens was obtained.

Further, the intermediate film was implemented as a hard coating film formed by application of hard coating solution.

The hard coating solution was produced as follows.

Firstly, 206 g (grams) of methanol, 300 g of a methanol-dispersed titania sol (made by JGC Catalysts and Chemicals Ltd., solid content: 30%), 60 g of γ-glycidoxypropyltrimethoxysilane, 30 g of γ-glycidoxypropylmethyldiethoxysilane, and 60 g of tetraethoxysilane were dropped into a container, and 0.01 N (normality) of a hydrochloric acid aqueous solution was dropped into the mixed solution. The resultant mixed solution was stirred and hydrolyzed.

Then, 0.5 g of a flow regulating agent and 1.0 g of a catalyst were added, and the resultant mixed solution was stirred at room temperature for 3 hours.

This hard coat solution was applied to each surface of the spectacle lens base as follows.

That is, the hard coating solution was uniformly applied by a spin coating method, and was left as it was in an environment of 120° C. for 1.5 hours, whereby the hard coating solution was heat-cured.

In any of the hard coating films having been thus formed, the physical film thickness was 2.5 μm.

Further, for the optical multilayer films, in the same spectacle lens base, the film structure was the same on both the surfaces, and each of the optical multilayer films had a five-layer structure in which the low refractive index layers and the high refractive index layers were alternately deposited. The film thicknesses of at least one of the low refractive index layers and the high refractive index layers are different for each of Examples 1 to 5 and Comparative Examples. Examples 1 to 5 and Comparative Examples 1 to 6 have the same refractive index of $SiO_2$, and the same refractive index of $ZrO_2$.

Each of the optical multilayer films according to Examples 1 to 5 and Comparative Examples was formed by a vacuum deposition method.

The odd-numbered layers (the first, the third, the fifth layers) were the low refractive index layers, and were formed of silicon dioxide. The even-numbered layers (the second, the fourth layers) were the high refractive index layers, and were formed of zircon dioxide.

In the following [Table 1], the refractive index, the film thickness, and the like of each layer in the optical multilayer film of each of Examples 1 to 5 and Comparative Example 6 are shown. In [Table 2], the refractive index, the film thickness, and the like of each layer in the optical multilayer film in each of Comparative Examples 1 to 5 are shown.

In Example 1, a quotient obtained by dividing the physical thickness of the fourth layer by the physical thickness of the second layer is about 1.09 which is almost 1. The quotient being almost 1 can be translated into the ratio of the physical thickness of the fourth layer to the physical thickness of the second layer being about 1:1, as shown in "$ZrO_2$ physical thickness ratio between 2nd layer and 4th layer" column in [Table 1].

Likewise, in Example 2, the quotient is about 1.30, and the ratio is about 2:3. In Example 3, the quotient is 2.00, and the ratio is 1:2. Further, in Example 4, the quotient is about 2.98, and the ratio is about 1:3. Furthermore, in Example 5, the quotient is about 3.98, and the ratio is about 1:4.

On the other hand, as shown in [Table 2], in Comparative Example 1, the quotient is about 0.67, and the ratio is about 3:2. In Comparative Example 2, the quotient is 0.50, and the ratio is 2:1. Further, in Comparative Example 3, the quotient is 0.66, and the ratio is about 3:2. Furthermore, in Comparative Example 4, the quotient is about 0.33, and the ratio is about 3:1. Moreover, in Comparative Example 5, the quotient is 0.20, and the ratio is 5:1.

As shown in [Table 1], in Comparative Example 6, the quotient is about 4.88, and the ratio is about 1:5.

TABLE 1

| Layer | Material | Refractive index | Example 1 | Example 2 | Example 3 | Example 4 | Example 5 | Com. Example 6 |
|---|---|---|---|---|---|---|---|---|
| | | | \multicolumn{6}{c}{$ZrO_2$ physical thickness ratio between 2nd layer and 4th layer} | | | | | |
| | | | 1:1 | 2:3 | 1:2 | 1:3 | 1:4 | 1:5 |
| | | | \multicolumn{6}{c}{Physical thickness [nm]} | | | | | |
| 1st layer | $SiO_2$ | 1.4776 | 29.01 | 44.05 | 78.20 | 78.00 | 78.00 | 73.61 |
| 2nd layer | $ZrO_2$ | 2.0939 | 43.00 | 42.30 | 30.64 | 28.00 | 24.00 | 20.78 |
| 3rd layer | $SiO_2$ | 1.4776 | 24.95 | 22.71 | 23.83 | 16.83 | 17.60 | 20.75 |

TABLE 1-continued

|  |  |  | Example 1 | Example 2 | Example 3 | Example 4 | Example 5 | Com. Example 6 |
|---|---|---|---|---|---|---|---|---|
|  |  |  | ZrO₂ physical thickness ratio between 2nd layer and 4th layer | | | | | |
| Layer | Material | Refractive index | 1:1 | 2:3 | 1:2 | 1:3 | 1:4 | 1:5 |
|  |  |  | Physical thickness [nm] | | | | | |
| 4th layer | ZrO₂ | 2.0939 | 47.00 | 55.00 | 61.28 | 83.50 | 95.45 | 101.47 |
| 5th layer | SiO₂ | 1.4776 | 98.92 | 98.00 | 98.50 | 89.44 | 84.73 | 83.08 |

TABLE 2

|  |  |  | Com. Example 1 | Com. Example 2 | Com. Example 3 | Com. Example 4 | Com. Example 5 |
|---|---|---|---|---|---|---|---|
|  |  |  | ZrO₂ physical thickness ratio between 2nd layer and 4th layer | | | | |
| Layer | Material | Refractive index | 3:2 | 2:1 | 3:2 | 3:1 | 5:1 |
|  |  |  | Physical thickness [nm] | | | | |
| 1st layer | SiO₂ | 1.4776 | 22.38 | 35.00 | 22.00 | 23.06 | 18.67 |
| 2nd layer | ZrO₂ | 2.0939 | 30.00 | 30.00 | 50.00 | 50.00 | 50.00 |
| 3rd layer | SiO₂ | 1.4776 | 47.00 | 76.72 | 34.07 | 43.00 | 28.85 |
| 4th layer | ZrO₂ | 2.0939 | 20.00 | 15.00 | 33.00 | 16.50 | 10.00 |
| 5th layer | SiO₂ | 1.4776 | 98.77 | 132.24 | 119.95 | 115.26 | 99.31 |

In Examples 1 to 5 and Comparative Examples 1 to 6, spectral reflectance distributions in the visible region were measured by using a measuring machine. FIG. 1 shows the spectral reflectance distributions in the visible region according to Examples 1 to 5 and Comparative Example 6, and FIG. 2 shows the spectral reflectance distributions in the visible region according to Comparative Examples 1 to 5.

According to the reflectance distributions shown in FIG. 1, in each of Examples 1 to 5 and Comparative Example 6, the maximum transmittance in the visible region (in which the wavelength is greater than or equal to 420 nm and not greater than 720 nm) is not greater than 3%. More specifically, the transmittance of 2.2% at the wavelength of 518 nm in Example 1 is the maximum transmittance. Therefore, it is found that each of Examples 1 to 5 and Comparative Example 6 has antireflective performance in the visible region.

Figure 2:
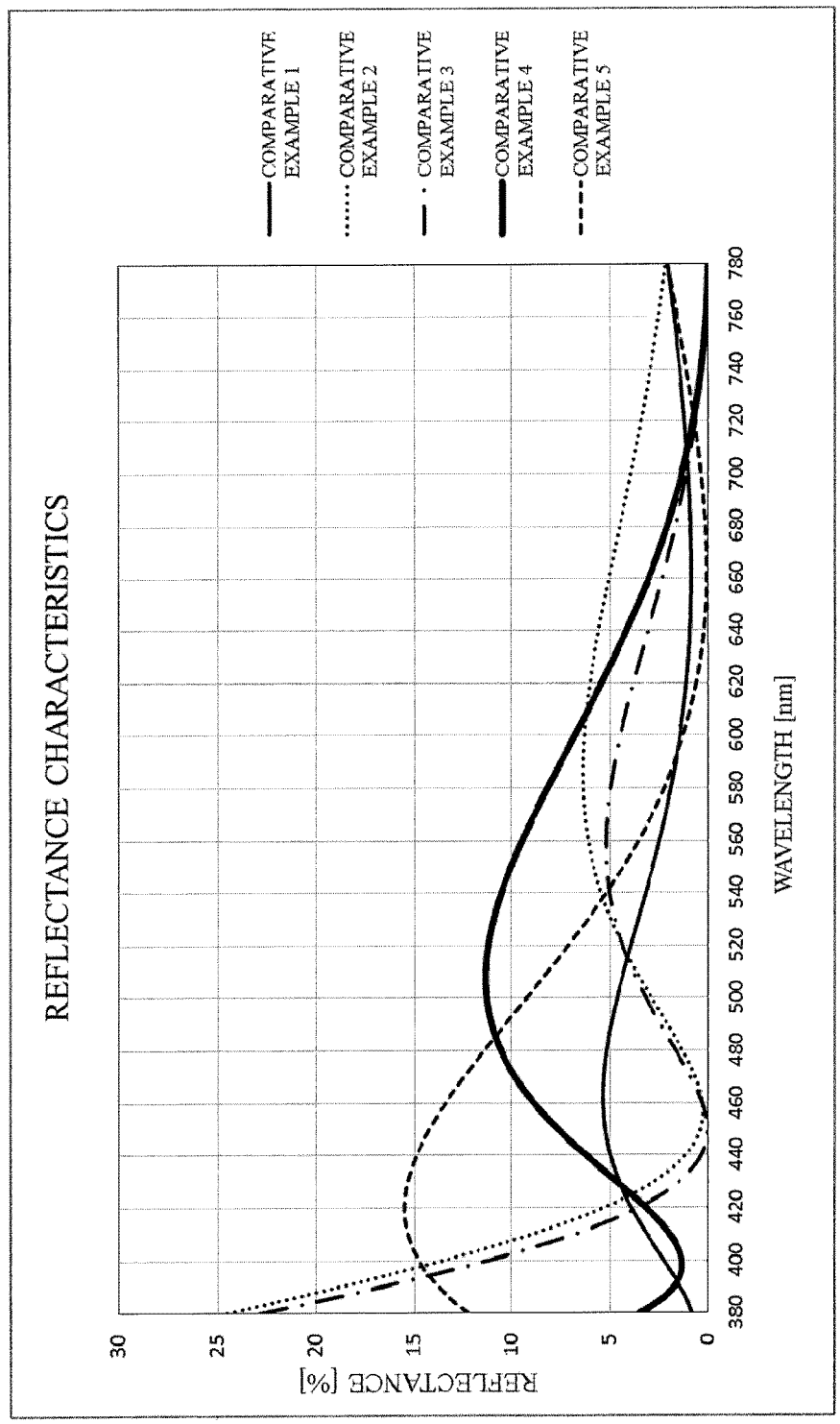
FIG. 2 shows a graph representing a spectral reflectance distribution in a visible region according to Comparative Examples 1 to 5.

In contrast, according to the reflectance distributions shown in FIG. 2, in Comparative Examples 1 to 5, the maximum transmittance in the visible region is about 5 to 15%, and therefore it is hard to say that Comparative Examples 1 to 5 have sufficient antireflective performance in the visible region.

That is, when the quotient obtained by dividing the physical thickness of the fourth layer by the physical thickness of the second layer is greater than or equal to 1 as in Examples 1 to 5 and Comparative Example 6, a sufficient antireflective function in the visible region can be achieved. On the other hand, when the quotient obtained by dividing the physical thickness of the fourth layer by the physical thickness of the second layer is less than 1 as in Comparative Examples 1 to 5, it is difficult to provide a sufficient antireflective function in the visible region.

Examples 1 to 5 and Comparative Example 6 were examined for heat resistance by a heat resistance test and an accelerated heat resistance test. Comparative Examples 1 to 5 were not examined for heat resistance because the antireflective properties thereof were insufficient.

Firstly, the heat resistance test will be described. Samples of Examples 1 to 5 and Comparative Example 6 were loaded in ovens which were set at temperatures indicated next to "Result of heat resistance test" in the following [Table 3]. Measurement of a loading time during which each sample was placed in the oven was started simultaneously with loading of the sample in the oven. The measurement of the loading time was suspended each time the loading time reached 5 minutes, and the sample was taken out of the oven to visually recognize whether or not crack occurred. At a point in time when crack occurred, the heat resistance test for each of Examples 1 to 5 and Comparative Example 6 was ended. On the other hand, when crack did not occur, each sample was returned to the oven and measurement of the loading time was resumed. When the loading time for each temperature reached 30 minutes in total, loading at that temperature was ended, and the sample was loaded in the oven set at a one-stage (10° C.) higher temperature, and then measurement of the loading time was started from the beginning.

The result of the heat resistance test is shown in [Table 3].

TABLE 3

|  |  | Example 1 | | Example 2 | | Example 3 | |
|---|---|---|---|---|---|---|---|
|  |  | ZrO₂ physical thickness ratio between 2nd layer and 4th layer | | | | | |
|  |  | 1:1 | | 2:3 | | 1:2 | |
| Result of heat resistance test | 60° C. | 30 min | No problem | 30 min | No problem | 30 min | No problem |
|  | 70° C. | 30 min | No problem | 30 min | No problem | 30 min | No problem |
|  | 80° C. | 30 min | No problem | 30 min | No problem | 30 min | No problem |
|  | 90° C. | 30 min | No problem | 30 min | No problem | 30 min | No problem |

TABLE 3-continued

|  |  |  |  |  |  |  |  |
|---|---|---|---|---|---|---|---|
| 100° C. | 30 min | No problem | 30 min | No problem | 30 min | No problem |
| 110° C. | 30 min | No problem | 30 min | No problem | 30 min | No problem |
| 120° C. | 30 min | No problem | 20 min | Crack | 10 min | Crack |
| 130° C. | 5 min | Crack | — |  | — |  |

|  |  | Example 4 | | Example 5 | | Com. Example 6 | |
|---|---|---|---|---|---|---|---|
|  |  | ZrO₂ physical thickness ratio between 2nd layer and 4th layer | | | | | |
|  |  | 1:3 | | 1:4 | | 1:5 | |
| Result of heat resistance test | 60° C. | 30 min | No problem | 30 min | No problem | 30 min | No problem |
|  | 70° C. | 30 min | No problem | 30 min | No problem | 30 min | No problem |
|  | 80° C. | 30 min | No problem | 30 min | No problem | 30 min | No problem |
|  | 90° C. | 30 min | No problem | 30 min | No problem | 30 min | No problem |
|  | 100° C. | 30 min | No problem | 30 min | No problem | 10 min | Crack |
|  | 110° C. | 30 min | Crack | 30 min | Crack | — |  |
|  | 120° C. | — |  | — |  | — |  |
|  | 130° C. | — |  | — |  | — |  |

According to [Table 3], in Comparative Example 6 (having the quotient of about 4.88, and the ratio of about 1:5), the sample was loaded in the oven at 60° C., and withstood until 5 minutes elapsed at 100° C., but crack occurred after 10 minutes elapsed at 100° C.

In contrast, in Example 5 (having the quotient of about 3.98, and the ratio of about 1:4), the sample was placed in the oven at 60° C., and crack did not occur until 30 minutes elapsed at 110° C. Also in Example 4 (having the quotient of about 2.98, and the ratio of about 1:3), crack did not occur until 30 minutes elapsed at 110° C. Further, in Example 3 (having the quotient of 2.00, and the ratio of 1:2), crack did not occur until 10 minutes elapsed at 120° C. Furthermore, in Example 2 (having the quotient of about 1.30, and the ratio of about 2:3), crack did not occur until 20 minutes elapsed at 120° C. Moreover, in Example 1 (having the quotient of about 1.09, and the ratio of about 1:1), crack did not occur until 5 minutes elapsed at 130° C.

Accordingly, it is found that, as compared to the Comparative Example, Example 5 has the higher heat resistance, and Examples 4, 3, 2 and 1 have still higher resistances in this order.

Next, the accelerated heat resistance test will be described. Samples of Examples 1 to 5 and Comparative Examples were loaded in a constant temperature constant humidity tester (LHU-113 manufactured by ESPEC Corp.) kept at a temperature of 60° C. and a humidity of 95%, and were left continuously for 3 days (72 hours). Thereafter, the samples were taken out of the constant temperature constant humidity tester, and were subjected to the same procedure as the heat resistance test by using ovens set at temperatures indicated next to "Result of accelerated heat resistance test" in the following [Table 4]. Loading of the samples in the constant temperature constant humidity tester provides, in a short time, the same states of the samples as those obtained after a long period of time.

TABLE 4 shows the result of the accelerated heat resistance test.

|  |  | Example 1 | | Example 2 | | Example 3 | |
|---|---|---|---|---|---|---|---|
|  |  | ZrO₂ physical thickness ratio between 2nd layer and 4th layer | | | | | |
|  |  | 1:1 | | 2:3 | | 1:2 | |
| Result of accelerated heat resistance test | 60° C. | 30 min | No problem | 30 min | No problem | 30 min | No problem |
|  | 70° C. | 30 min | No problem | 30 min | No problem | 30 min | No problem |
|  | 80° C. | 30 min | No problem | 30 min | No problem | 30 min | No problem |
|  | 90° C. | 30 min | Crack | 10 min | Crack | 5 min | Crack |
|  | 100° C. | — |  | — |  | — |  |
|  | 110° C. | — |  | — |  | — |  |
|  | 120° C. | — |  | — |  | — |  |
|  | 130° C. | — |  | — |  | — |  |
|  |  | Example 4 | | Example 5 | | Com. Example 6 | |
|  |  | ZrO₂ physical thickness ratio between 2nd layer and 4th layer | | | | | |
|  |  | 1:3 | | 1:4 | | 1:5 | |
| Result of accelerated heat resistance test | 60° C. | 30 min | No problem | 30 min | No problem | 30 min | No problem |
|  | 70° C. | 30 min | No problem | 30 min | No problem | 30 min | No problem |
|  | 80° C. | 10 min | Crack | 15 min | Crack | 10 min | Crack |
|  | 90° C. | — |  | — |  | — |  |
|  | 100° C. | — |  | — |  | — |  |
|  | 110° C. | — |  | — |  | — |  |
|  | 120° C. | — |  | — |  | — |  |
|  | 130° C. | — |  | — |  | — |  |

According to [Table 4], in Comparative Example 6 (having the quotient of about 4.88), the sample was loaded in the oven at 60° C., and withstood until 5 minutes elapsed at 80° C., but crack occurred after 10 minutes elapsed at 80° C.

In contrast, in Example 5 (having the quotient of about 3.98), the sample was loaded in the oven at 60° C., and crack did not occur until 15 minutes elapsed at 80° C. Also in Example 4 (having the quotient of about 2.98), crack did not occur until 10 minutes elapsed at 80° C. Further, in Example 3 (having the quotient of 2.00), crack did not occur until 5 minutes elapsed at 90° C. Furthermore, in Example 2 (having the quotient of about 1.30), crack did not occur until 10 minutes elapsed at 90° C. Moreover, in Example 1 (having the quotient of about 1.09), crack did not occur until 30 minutes elapsed at 90° C.

Accordingly, it is found that, as compared to Comparative Example, Example 4 has the equivalent heat resistance (durability of heat resistance performance) after elapse of a long period of time, Example 5 has a little higher heat resistance after elapse of a long period of time, and Examples 3, 2 and 1, in this order, have still higher heat resistances after elapse of a long period of time.

As in Examples 1 to 5, when the quotient obtained by dividing the physical thickness of the fourth layer in the optical multilayer film by the physical thickness of the second layer is not greater than 4, it is possible to achieve sufficient heat resistance while providing an antireflective function in the visible region, in the simple and easy-to-form optical multilayer film having the five-layer structure using $SiO_2$ and $ZrO_2$. When the quotient is less than 1 as in Comparative Examples 1 to 5, it is difficult to design the optical multilayer film for providing a sufficient antireflective function in the visible region.

As is understood from Example 5 to Example 1 seen in order, as the quotient approaches closer to 1 (the ratio of the physical thickness of the fourth layer to that of the second layer approaches closer to 1:1), the heat resistance is more improved while the antireflective function is maintained.

Spectacles that allow achievement of both antireflective properties to light in a visible region and heat resistance can be produced by using the spectacle lens according to Examples 1 to 5. Further, optical products, such as films for windows (buildings, vehicles, and the like), camera lens filters, and the like, having the same characteristics as those of Examples 1 to 5, can be produced.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An optical product comprising:
    a base; and
    an optical multilayer film, which prevents reflection in a visible region, formed on both surfaces of the base, wherein the optical multilayer film comprises a five-layer structure in which $SiO_2$ and $ZrO_2$ are alternately layered;
    wherein a layer of the multilayer film closest to the base is a first layer; and
    wherein a quotient obtained by dividing a physical thickness of a fourth layer, that is $ZrO_2$, by a physical thickness of a second layer, that is $ZrO_2$, is in a range of 1 or more to 1.5 or less.

2. A spectacle lens comprising the optical product according to claim 1.

3. Spectacles comprising the spectacle lens according to claim 2.

* * * * *